United States Patent [19]
Kii et al.

[11] Patent Number: 6,047,872
[45] Date of Patent: Apr. 11, 2000

[54] CORE BREAKING MACHINE FOR PARTIALLY BREAKING THE CORE OF WEATHER STRIP

[75] Inventors: Asajiro Kii; Masanori Shoji, both of Hiroshima, Japan

[73] Assignee: Nishikawa Rubber Co., Ltd., Hiroshima, Japan

[21] Appl. No.: 09/191,616

[22] Filed: Nov. 13, 1998

Related U.S. Application Data

[62] Division of application No. 08/878,317, Jun. 18, 1997, Pat. No. 5,871,682, which is a continuation of application No. 08/556,742, Nov. 7, 1995, abandoned.

[30] Foreign Application Priority Data

Nov. 16, 1994 [JP] Japan .................................. 6-308194
Mar. 24, 1995 [JP] Japan .................................. 7-91534

[51] Int. Cl.$^7$ .............................. B26F 3/00; B32B 31/16
[52] U.S. Cl. .............................................. 225/97; 225/96.5
[58] Field of Search ................................ 225/97, 96, 96.5, 225/101, 102; 72/381, 383; 29/426.4, 527.1, 700

[56] References Cited

U.S. PATENT DOCUMENTS

| | | | |
|---|---|---|---|
| 1,695,836 | 12/1928 | Witmer | 72/383 |
| 2,334,873 | 11/1943 | Held | 225/97 |
| 3,167,856 | 2/1965 | Zoller | 29/527.1 X |
| 3,222,769 | 12/1965 | Le Plae | 29/527.1 X |
| 3,371,447 | 3/1968 | Ruff et al. | 29/527.1 X |
| 3,399,448 | 9/1968 | Jackson | 29/527.1 X |
| 3,455,018 | 7/1969 | Collins | 29/527.1 |
| 3,527,013 | 9/1970 | Kruschwitz | 428/122 X |
| 4,250,612 | 2/1981 | Narita | 29/527.1 |
| 4,343,845 | 8/1982 | Burden et al. | 428/122 |
| 4,522,039 | 6/1985 | McNeill | 225/97 X |
| 5,143,666 | 9/1992 | McManus et al. | 428/122 X |
| 5,204,157 | 4/1993 | Matsumiya | 428/122 X |
| 5,249,353 | 10/1993 | Kranz | 29/527.1 X |
| 5,407,116 | 4/1995 | Nishishita et al. | 225/96.5 X |

FOREIGN PATENT DOCUMENTS 53-75627  7/1978  Japan .

*Primary Examiner*—Rinaldi I. Rada
*Assistant Examiner*—Charles Goodman
*Attorney, Agent, or Firm*—Flynn, Thiel, Boutell & Tanis, P.C.

[57] ABSTRACT

A core breaking machine including a plurality of shafts arranged in a row and supported for rotation, bending members on which weather strip is mounted, and gears fixedly mounted on the lower ends of the shafts so that the adjacent gears are engaged with one another. A driving mechanism is also provided for driving the gears to alternately rotate the bending members in opposite directions from one another through a predetermined angle to fracture portions of the weather strip.

10 Claims, 8 Drawing Sheets

6,047,872

CORE BREAKING MACHINE FOR PARTIALLY BREAKING THE CORE OF WEATHER STRIP

This is a division of Ser. No. 08/878,317, filed Jun. 18, 1997 and issued as U.S. Pat. No. 5,871,682 on Feb. 16, 1999, which is a continuation of Ser. No. 08/556,742, filed Nov. 7, 1995, now abandoned.

BACKGROUND OF THE INVENTION

1. Field of the Invention

The present invention relates to a weather strip with built-in core to be attached to a flange formed on a frame defining an opening in the body of an automobile, a method of partially breaking the core of a weather strip, and a core breaking machine for partially breaking the core of a weather strip.

2. Description of the Related Art

Conventional cores to be buried in weather strips to be put on a flange formed on a frame defining an opening in the body of an automobile are classified into the following types:

a) Cores of a wire carrier type formed by bending a wire in the shape of a hairpin;

b) Cores of a breakout type formed by arranging U-shaped loops at intervals in the shape of a channel;

c) Cores of a rhombus type formed by punching a strip in a shape having a successive arrangement of rhombuses;

d) Cores of a lath type formed by punching holes in a strip;

e) Cores of fish-bone type formed by punching and bending a strip in a fish-bone shape.

A weather strip provided with the core of a breakout type is bendable, stretchable and contractible when putting the weather strip on the flange because the U-shaped loops are separated from each other and, therefore, the weather strip can be easily put on the flange. On the other hand, a weather strip provided with a core of a type other than the breakout type is bendable but neither stretchable nor contractible and, therefore, it is difficult to put the weather strip on the flange. However, the weather strip provided with a core of a breakout type is inferior in capability of holding to the flange and the weather strip is liable to fall off the flange.

Referring to FIGS. 1 to 4, a method of putting a weather strip 10 integrally provided with a core 20 of, for example, a fish-bone type formed by successively connecting U-shaped loops 21 by a longitudinal connecting part 22 as shown in FIG. 3 on a flange formed in a frame defining an opening in the body of an automobile, punches out a portion 23 of the connecting part 22 to enable the weather strip 10 to be stretched or contracted so that the length of the weather strip 10 coincides with that of the flange. Another method of putting the weather strip 10 on the flange forms the weather strip 10 in a length shorter than that of the flange, puts the weather strip 10 on the flange so that the opposite ends of the weather strip 10 are spaced apart, and an end cap 60 is put on and attached with an adhesive 70 to the opposite ends of the weather strip 10 as shown in FIG. 4. These methods require troublesome work.

The weather strip integrally provided with a core of a breakout type is formed by extruding rubber or synthetic resin in the shape of the weather strip together with a core, and bending the weather strip by a bender to break apart the U-shaped loops of the core so that the weather strip is stretchable and contractible to facilitate the work for putting the weather strip on the flange. However, this weather strip is liable to slip out of position and to fall off the flange due to thermal contraction or the like.

SUMMARY OF THE INVENTION

Accordingly, it is an object of the present invention to provide a stretchable and contractible weather strip integrally provided with a partially broken core, capable of being easily and firmly put on a flange formed on a frame defining an opening in the body of an automobile.

Another object of the present invention is to provide a method of partially breaking the core of a weather strip to make the weather strip stretchable and contractible.

A further object of the present invention is to provide a core breaking machine for partially breaking the core of a weather strip to make the weather strip stretchable and contractible.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE PREFERRED EMBODIMENTS

Figure 1:
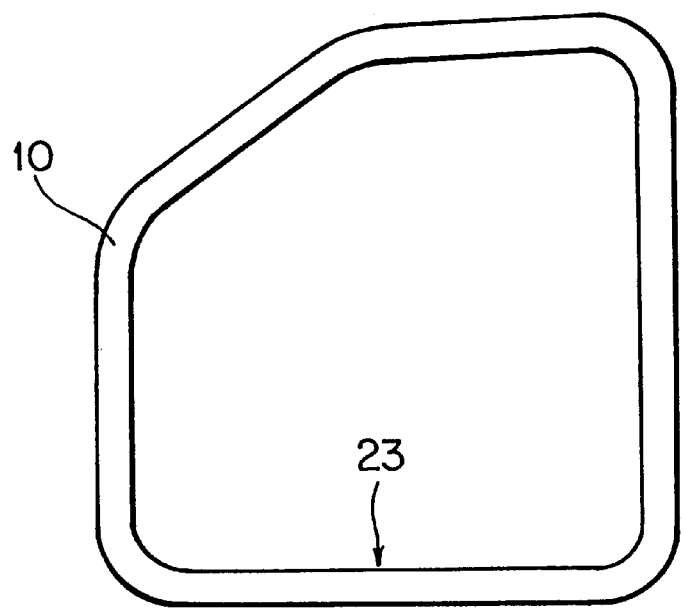
FIG. 1 is a side view of a conventional weather strip integrally provided with a core.
Figure 2:
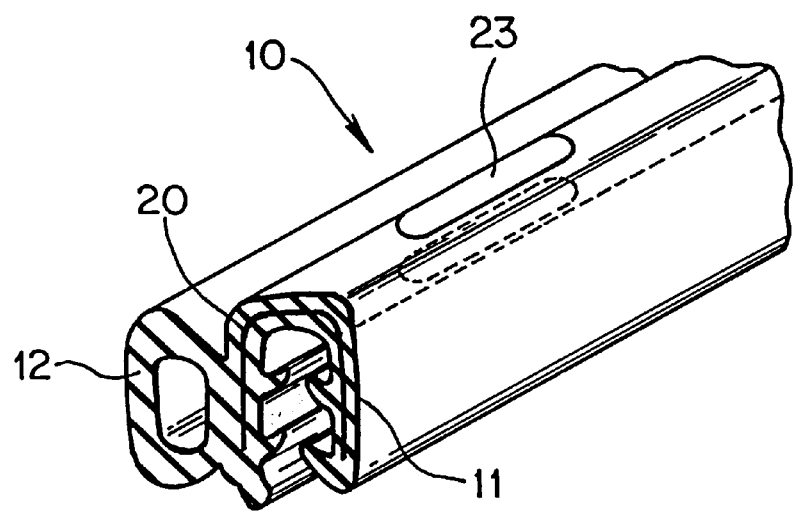
FIG. 2 is a perspective view of the weather strip of FIG. 1.
Figure 3:
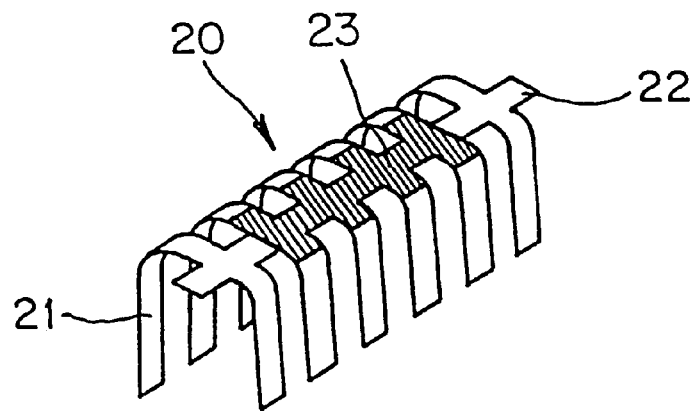
FIG. 3 is a perspective view of a core buried in the weather strip of FIG. 2.
Figure 4:
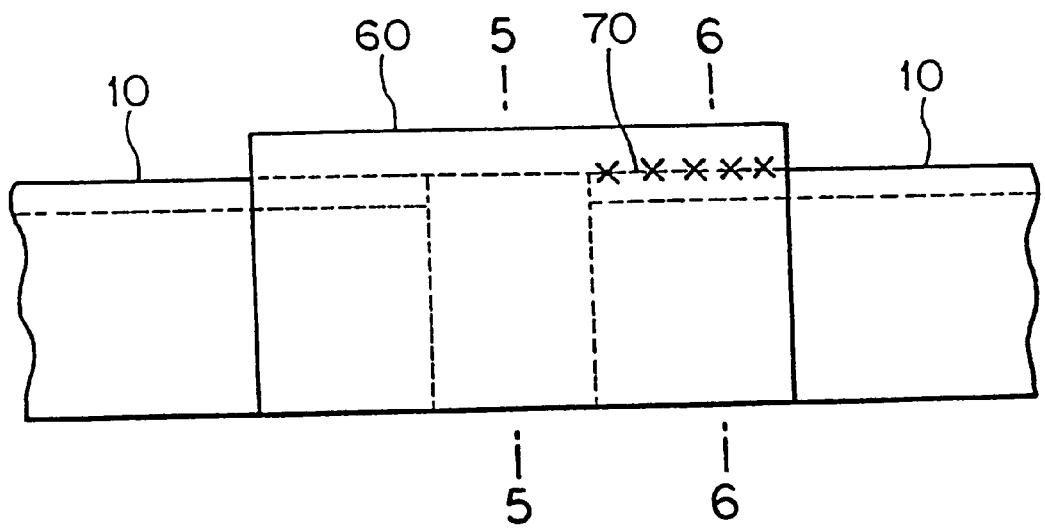
FIG. 4 is a fragmentary front view of another conventional weather strip integrally provided with a core.
Figure 5:
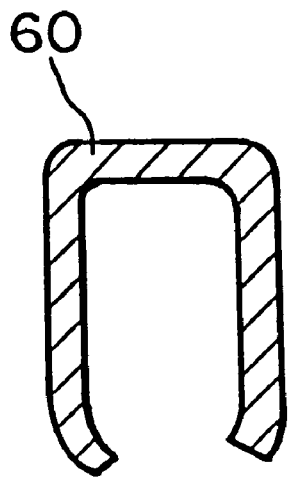
FIG. 5 is a sectional view taken on the line 5—5 in FIG. 4.
Figure 6:
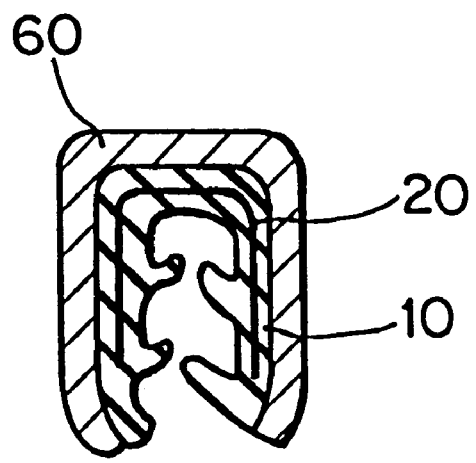
FIG. 6 is a sectional view taken on the line 6—6 in FIG. 4.
Figure 7:
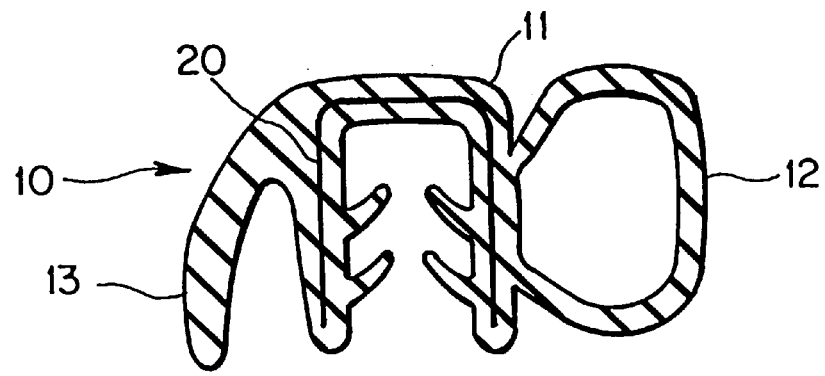
FIG. 7 is a sectional view of a weather strip integrally provided with a core, in a preferred embodiment according to the p)resent invention.
Figure 8:
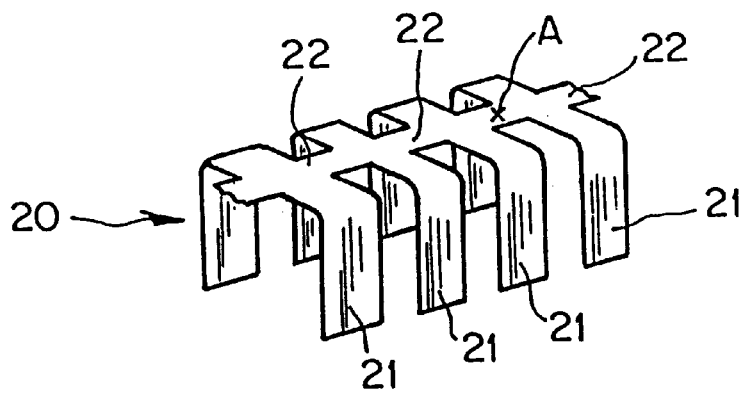
FIG. 8 is a fragmentary perspective view of the core of the weather strip of FIG. 7.
Figure 9:
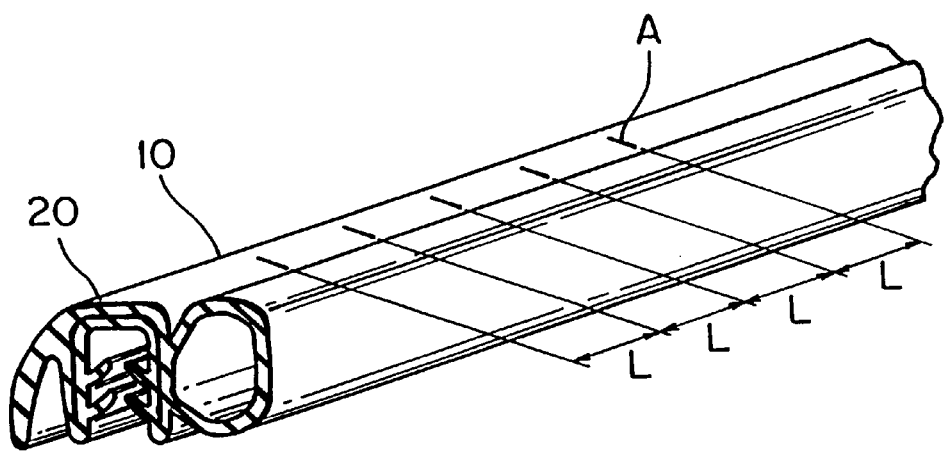
FIG. 9 is a fragmentary perspective view of the weather strip of FIG. 7, of assistance in explaining positions where the core of the weather strip is broken apart.

Referring to FIGS. 7 and 8, a weather strip 10 in a preferred embodiment according to the present invention is an integral structure having a welt part 11 of a substantially U-shaped cross section to be put on a flange formed on the body of a car, a hollow sealing part 12 protruding from the outer side wall of the welt part 11, a lip 13 projecting from the inner side wall of the welt part 11, and a core 20 (a fish-bone core in this embodiment) having a plurality of U-shaped loops 21 and a linear connecting part 22 successively connecting the U-shaped loops 21, and buried in the welt part 11 with the connecting part 22 extended in the upper wall of the welt part 11.

Figure 10:
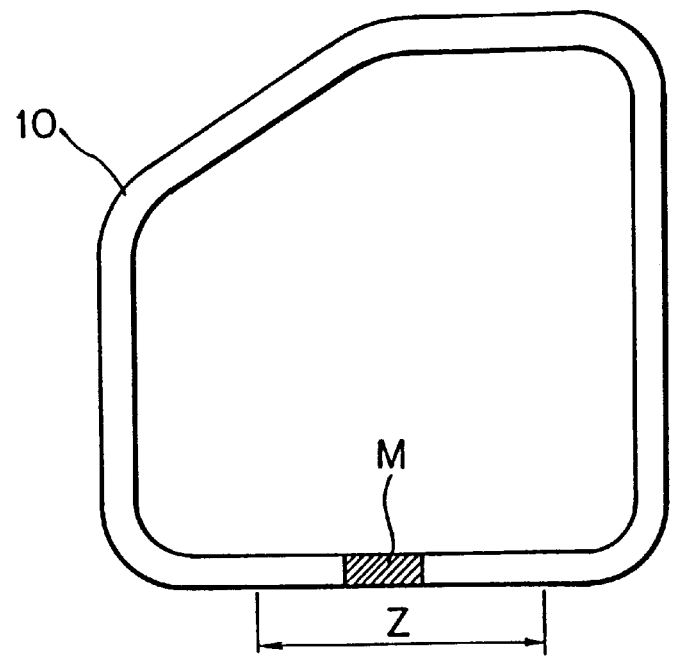
FIG. 10 is a side view of the weather strip of FIG. 7, of assistance in explaining a section of the weather strip in which the core is broken apart.
Figure 11:
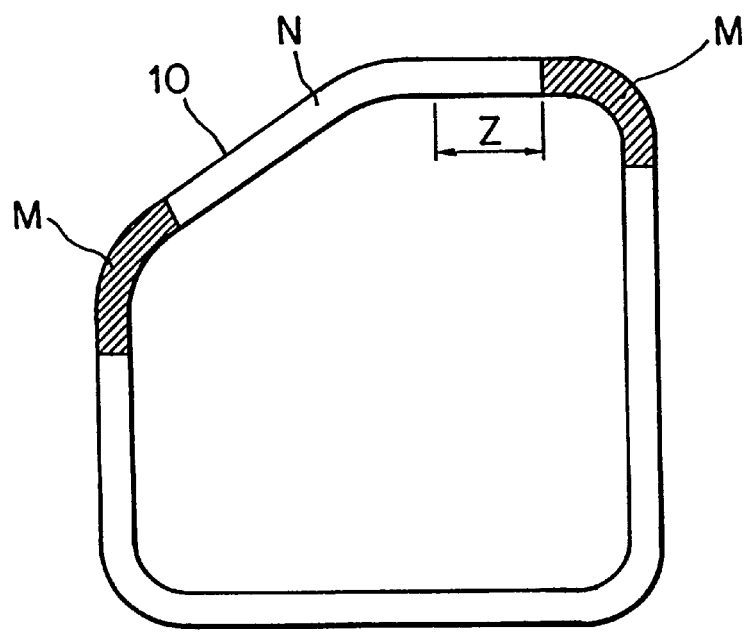
FIG. 11 is a side view of the weather strip of FIG. 7, of assistance in explaining a section of the weather strip in which the core is broken apart.

As shown in FIGS. 8, 9, 10 and 11, the connecting part 22 of the core 20 is cut at positions A spaced apart at intervals L in a breakout section Z so that the breakout section Z of the weather strip is stretchable and contractible. When the weather strip 10 is put on the flange around the edge of the opening, the breakout section Z is formed in a portion of the weather strip 10 corresponding to the lower edge of the opening as shown in FIG. 10. When the weather strip 10 of extrusion is put on the flange in a section N of the edge of the opening and the opposite ends of the weather strip 10 are joined to molded connecting members M, respectively, as shown in FIG. 11, the breakout section Z is formed in one end portion of the weather strip 10 as shown in FIG. 11.

Figure 12:
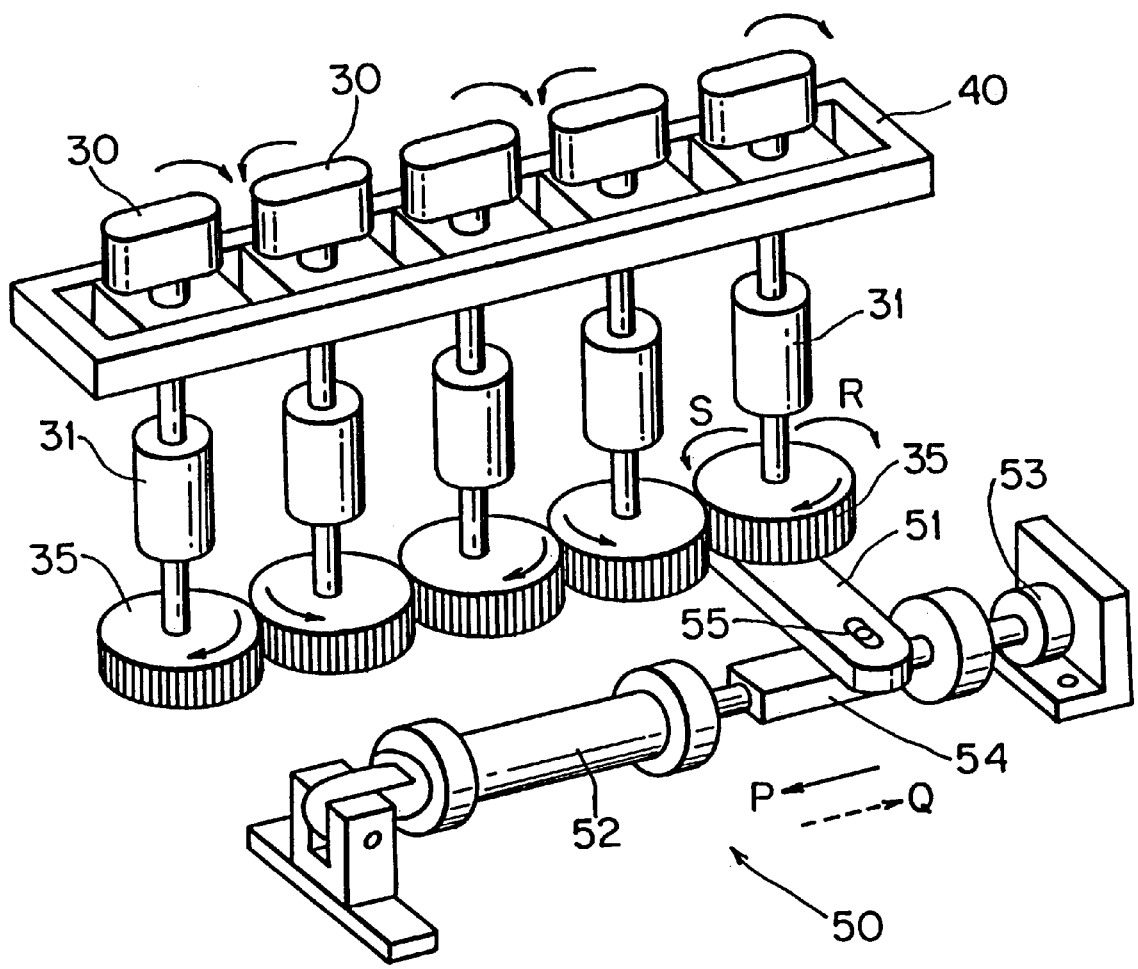
FIG. 12 is a typical perspective view of a core breaking machine in a preferred embodiment according to the present invention.

FIG. 12 shows a core breaking machine embodying the present invention for breaking the connecting part 22 of the core 20 at positions A spaced apart at the intervals L (FIG. 9) in the breakout section Z (FIG. 10 or 11). The core breaking machine comprises shafts 31 arranged in a row and supported for turning in bearings on a support frame 40, bending members 30 of a fixed length L (30 to 35 mm) on which the breakout section Z of the weather strip 10 is put on, fixedly joined to the upper ends of the shafts 31, respectively, gears 35 fixedly mounted on the lower ends of the shafts 31, respectively, so that the adjacent gears 35 are engaged, and a driving mechanism 50 for driving the gears 35 for turning alternately in opposite directions indicated by the arrows S and R to turn the bending members 30 for turning alternately in opposite directions in the directions of the arrows through a predetermined angle, respectively. The driving mechanism 50 comprises a driving cylinder actuator 52, a stopper cylinder actuator 53, a link 54 having one end connected to the extremity of the actuating rod of the driving cylinder actuator 52 and the other end connected to the extremity of the actuating rod of the stopper cylinder actuator 53, and an arm 51 having one end fixed to one of the gears 35 and the other end joined to a pin 55 attached to the link 54.

Figure 13:
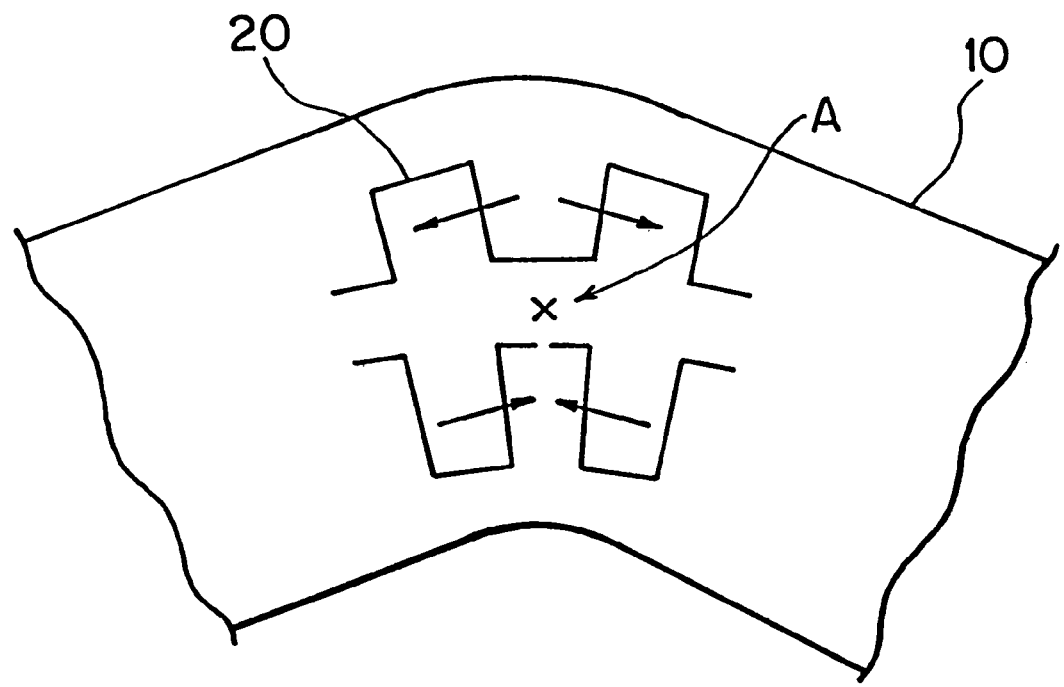
FIG. 13 is a diagrammatic view of assistance in explaining the core breaking principle of the core breaking machine of FIG. 10.
Figure 14:
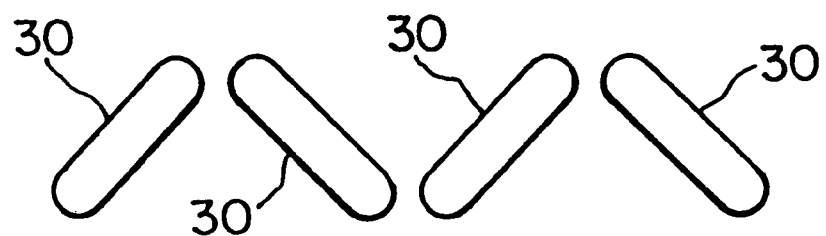
FIG. 14 is a plan view of assistance in explaining the action of the core bending members of the core breaking machine of FIG. 10.
Figure 15:
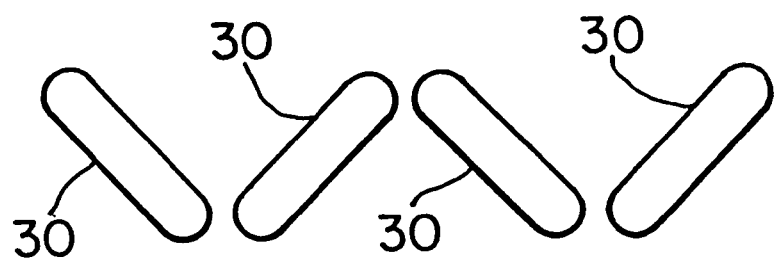
FIG. 15 is a plan view of assistance in explaining the action of the core bending members of the core breaking machine of FIG. 10.
Figure 16:
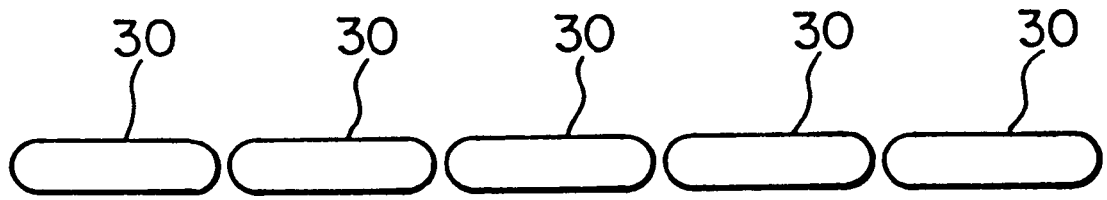
FIG. 16 is a plan view of assistance in explaining the action of the core bending members of the core breaking machine of FIG. 10.

When partly breaking the core 20 of the weather strip 10 at positions in the breakout section Z, the bending members 30 are aligned as shown in FIG. 16, a portion of the welt part 11 in the breakout section Z of the weather strip 10 is put on the bending members 30, and then the driving mechanism 50 is actuated to project and retract the actuating rod of the driving cylinder actuator 52 alternately. When the actuating rod of the driving cylinder actuator 52 is moved a predetermined distance in the direction of the arrow P, the gear 35 interlocked with the driving mechanism 50 turns through a predetermined angle in the direction of the arrow R and the adjacent gears 35 turn in opposite directions as indicated by the arrows in FIG. 12. Consequently, the bending members 30 are turned to positions shown in FIG. 14 to bend the weather strip 10 in a zigzag shape, so that the core 20 is bent as shown in FIG. 13. Then the actuating rod of the driving cylinder 52 is moved a predetermined distance in the direction of the arrow Q. Consequently, the gear 35 interlocked with the driving mechanism 50 turns through a predetermined angle in the direction of the arrow S and the adjacent gears 35 turn in opposite directions opposite the directions indicated by the arrows in FIG. 12, and the bending members 30 are turned to positions shown in FIG. 15 to bend the weather strip 10 in opposite directions in a zigzag shape, so that the core 20 is bent in a direction opposite the direction shown in FIG. 13.

As the weather strip 10 is thus bent in the zigzag shapes repeatedly, the connecting part 22 of the core 20 breaks at positions A (FIG. 13) due to fatigue. After the bending of the weather strip 10 has been repeated a predetermined number of times, the driving mechanism 50 is stopped so that the bending members 30 are stopped at positions shown in FIG. 16, and the weather strip 10 is removed from the core breaking machine.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A core breaking apparatus for preparing an elongate length of weather strip prior to installation about an edge of an opening in a body of an automobile, the weather strip having an outer part and an elongate core buried within the outer part, said apparatus comprising:

a frame;

a plurality of shafts rotatably supported on said frame;

each said shaft having a first end fixedly joined to an elongate bending member which rotates with said shaft, said bending members being spaced-apart from one another, each said bending member being configured for supporting a portion of the weather strip thereon;

each said shaft having a second end fixedly joined to a gear wheel which rotates with said shaft, adjacent ones of said gear wheels being engaged with one another for rotation in opposite directions from one another; and a drive arrangement for alternately rotating said adjacent gear wheels in opposite directions to effect rotation of the corresponding adjacent bending members in opposite directions from one another through a predetermined angle to fracture portions of the core of the weather strip and permit longitudinal stretching and contracting of the weather strip during installation thereof.

2. The apparatus of claim 1 wherein said bending members are rotatable between first positions wherein said bending members are longitudinally aligned with one another in end to end relationship and second positions wherein said adjacent bending members are oriented at an approximately 90° angle with respect to one another to form a zig-zag configuration.

3. The apparatus of claim 1 wherein said drive arrangement includes a cylinder actuator including a movable actuating rod having a first portion disposed within an interior of said cylinder actuator and a second portion disposed exteriorly of said cylinder actuator and operatively connected to one of said gear wheels.

4. The apparatus of claim 3 wherein said actuating rod is movable between an extended position for rotating each said gear wheel in a first direction through a first predetermined angle and a retracted position for rotating each said gear wheel in a second direction opposite said first direction through a second predetermined angle.

5. The apparatus of claim 3 wherein said drive arrangement includes:
- a stopper cylinder having an actuating rod including a first portion disposed within an interior of said stopper cylinder and a second portion disposed exteriorly of said stopper cylinder;
- a link having a first end connected to said second portion of said actuating rod of said cylinder actuator and a second end connected to said second portion of said actuating rod of said stopper cylinder; and
- an arm having a first end connected to said one gear wheel and a second end pivotably connected to said link.

6. A core breaking apparatus for preparing an elongate length of weather strip prior to installation about an edge of an opening in a body of an automobile, the weather strip having a portion with a generally U-shaped cross-section which defines an elongate channel therein, the portion including a fish-bone core buried therewithin which includes a plurality of U-shaped loops each having a pair of arms and a base portion extending transversely between and interconnecting the arms, the loops being longitudinally spaced apart from one another and each adjacent pair of loops being connected to one another by a single connecting part extending transversely between the base portions of the adjacent pair of loops, said apparatus comprising:
- a frame;
- a plurality of shafts rotatably supported on said frame;
- each said shaft having a first end fixedly mounting thereon an elongate bending member which rotates with said shaft, said bending members being spaced-apart from one another, each said bending member being configured for supporting the weather strip thereon by inserting said bending member into a portion of the elongate channel of the weather strip;
- each said shaft having a second end fixedly joined to a gear wheel which rotates with said shaft, adjacent ones of said gear wheels being engaged with one another for rotation in opposite directions from one another; and
- a drive arrangement for alternately rotating said adjacent gear wheels in opposite directions to effect rotation of the corresponding adjacent bending members in opposite directions from one another through a predetermined angle to fracture the connecting part between two adjacent loops of the weather strip.

7. The apparatus of claim 6 wherein said bending members are rotatable between first positions wherein said bending members are longitudinally aligned with one another in end to end relationship and second positions wherein said adjacent bending members are oriented at an approximately 90° angle with respect to one another to form a zig-zag configuration.

8. The apparatus of claim 6 wherein said drive arrangement includes a cylinder actuator including a movable actuating rod having a first portion disposed within an interior of said cylinder actuator and a second portion disposed exteriorly of said cylinder actuator and operatively connected to one of said gear wheels.

9. The apparatus of claim 8 wherein said actuating rod is movable between an extended position for rotating each said gear wheel in a first direction through a first predetermined angle and a retracted position for rotating each said gear wheel in a second direction opposite said first direction through a second predetermined angle.

10. The apparatus of claim 8 wherein said drive arrangement includes:
- a stopper cylinder having an actuating rod including a first portion disposed within an interior of said stopper cylinder and a second portion disposed exteriorly of said stopper cylinder;
- a link having a first end connected to said second portion of said actuating rod of said cylinder actuator and a second end connected to said second portion of said actuating rod of said stopper cylinder; and
- an arm having a first end connected to said one gear wheel and a second end pivotably connected to said link.

* * * * *